Patented Nov. 6, 1951

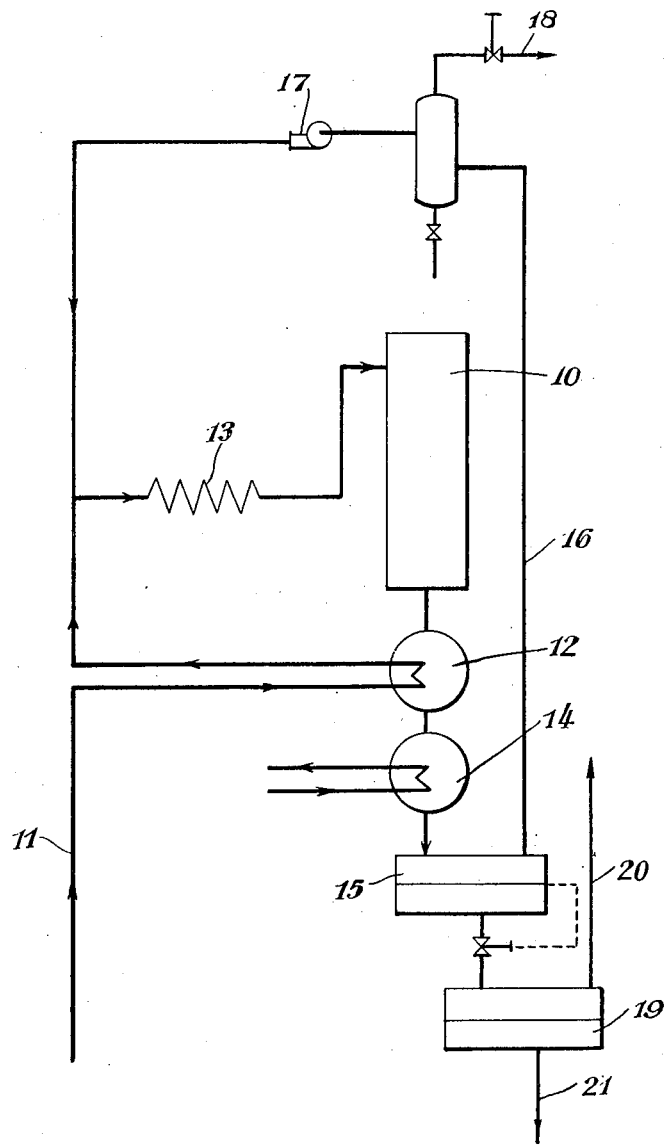

2,574,445

UNITED STATES PATENT OFFICE 2,574,445

CATALYTIC DESULFURIZATION OF KEROSENE AND WHITE SPIRITS

Frederick William Bertram Porter and Frank Robert George Green, Sunbury on Thames, England, assignors to Anglo-Iranian Oil Company Limited, London, England, a British joint-stock corporation Application August 27, 1948, Serial No. 46,502
In Great Britain August 26, 1947

6 Claims. (Cl. 196—28)

This invention relates to the catalytic desulphurisation of kerosene and white spirits.

Known processes for the catalytic desulphurisation of kerosene and white spirits, wherein organic sulphur compounds are reduced by hydrogen to hydrogen sulphide, are carried out under conditions which result in a net consumption of hydrogen proportional to the amount of sulphur removed and to the other side reactions which may take place, such, for example, as the hydrogenation of aromatics. It is, therefore, necessary to provide hydrogen from an extraneous source in order to carry out such known processes.

It has now been found that the catalytic desulphurisation of kerosenes and white spirits can be carried out without the need for added hydrogen and that the process can be operated to produce a net yield of hydrogen which can be used in other hydrogenation processes.

According to the invention, the desulphurisation of a petroleum fraction boiling within the range of about 150 to 240° C. is effected by passing the fraction in vapour form over a catalyst which under the reaction conditions employed combines activity for dehydrogenation of naphthene molecules to aromatics, with activity for the conversion of organically combined sulphur to hydrogen sulphide and which is not poisoned as a catalyst by the presence of sulphur compounds, at a temperature and at a pressure such that a considerable proportion of the combined sulphur contained in the fraction is converted into hydrogen sulphide and hydrogen is produced by dehydrogenation of some of the naphthenes contained in the fraction in an amount exceeding that required to effect said conversion of the combined sulphur contained in the fraction into hydrogen sulphide, separating hydrogen sulphide and a hydrogen-rich gas mixture from the treated fraction, and recycling said hydrogen-rich gas mixture to the reaction zone to constitute the whole of the hydrogen supplied to said zone and at a rate sufficient to maintain the necessary partial pressure of hydrogen therein.

It is believed that the reaction proceeds by dehydrogenation of some of the naphthenes to produce hydrogen in excess of that required to convert the combined sulphur present into hydrogen sulphide and the reaction conditions for any particular feedstock must therefore be determined having regard to any limiting conditions imposed by these two reactions. Thus, there is a lower temperature of about 700° F. below which little dehydrogenation would occur and below which the reaction would not be self-supporting in hydrogen. This lower temperature depends to some extent on the sulphur content and the higher the sulphur content, the higher the minimum temperature necessary to provide sufficient hydrogen. At temperatures above about 800° F., dehydrogenation occurs to such an extent that the product becomes increasingly aromatic. Furthermore, at temperatures above 800° F. the on-stream time is reduced. The preferred temperature of operation is to some extent dependent upon the pressure employed which is preferably between 50 and 250 lb./sq. in. As the pressure is increased, the minimum temperature at which satisfactory dehydrogenation of the naphthenes can be obtained increases; and if at a fixed temperature the pressure is sufficiently increased, the reverse reaction of hydrogenation of aromatics begins to occur. Thus, when operating at the higher pressures it is preferable to use higher temperatures. Similarly it is desirable to avoid the combination of high temperature and low pressure since such conditions lead to a short on-stream time for satisfactory operation. By operating under the optimum conditions, on-stream times of 300 to 400 hrs. before regeneration are possible.

The space velocity may be varied according to the degree of desulphurisation required and the activity of the catalyst but space velocities above 10 v./v./hr. result in a low degree of desulphurisation.

Operating under the conditions above described, the gases separated by cooling the treated fraction at reaction pressure contain 70 to 80% by volume of hydrogen and are continuously recycled to the reaction zone. It has been found that the hydrogen sulphide content of the separated gas builds up to an equilibrium concentration whereafter the gases may be recycled to the reaction zone without further increase in the content of hydrogen sulphide which is thereafter dissolved in the product until such time as it is depressurised. If desired, however, the hydrogen sulphide may be removed from the gas by any of the usual methods and the hydrogen sulphide-free gas recycled to the reaction zone. The gas may be submitted to treatment for increasing the relative proportion of hydrogen therein, as by passage through an oil tower. It is not necessary to supply extraneous hydrogen to the reaction zone when starting the process as the gases separated from the treated fraction may be allowed to build up to form the recycle gas.

Among the catalysts that may be used are metal sulphide and oxides especially those of the 6th group, either alone (e. g. chromium oxide and tungsten sulphide) or in admixture with other sulphides or oxides (e. g. pellets consisting of two parts tungsten sulphide and one part nickel sulphide) or in combination with other oxides or sulphides (e. g. cobalt molybdate or thiomolybdate) or mixed with or deposited on a porous support such as natural or processed bauxite, activated alumina and kieselguhr. Natural and processed bauxite may themselves be used as catalysts. The preferred catalyst consists of cobalt molybate supported on alumina.

An effective pelleted catalyst was prepared by mixing powdered cobalt oxide, molybdic oxide and alumina and pelleting with 1% graphite into $\frac{3}{16}''$ pellets which were then treated for two hours at 550° C. The catalyst could also be prepared by extrusion.

An effective cobalt molybdate type catalyst was prepared by the impregnation of roasted bauxite with cobalt molybdate solution so that the molybdenum content of the material stable at 1000° F. was 3–6% by weight while the cobalt content of the material stable at 1000° F. was 1.0% weight.

The process of the invention will now be described by way of example with reference to the accompanying diagram.

*Example*

An unrefined Iranian kerosene having the properties set out in the table below was fed to an autofining chamber 10 via line 11, heat exchanger 12 and preheater 13 where it was raised to a temperature of 780° F. at 100 lb./sq. in. pressure. The reactor 10 was charged with a catalyst consisting of cobalt molybdate on alumina and the products leaving the reactor, after being passed in heat exchange with the incoming feed in heat exchanger 12 were passed to a cooler 14, where they were cooled under plant pressure, and then to a gas separator 15. The gases leaving the separator through line 16 were recycled to the reaction zone, in admixture with the incoming feed, via the booster 17, excess gas being vented from the system via line 18. The cooled liquid product from the separator 15, which contained all the H2S in solution, was then reduced to atmospheric pressure in a further separator 19 in which the bulk of the H2S was separated and removed from the system via line 20. The desulphurised product was removed via line 21. Gas was recycled to the preheater at a rate of 4000 cu. ft./bbl. The gas make amounted to 60 cu. ft./bbl. consisting of 70–80% by volume hyhydrogen which was more than sufficient to maintain the recycle rate, the surplus gas being vented from the system.

Properties of the feedstock and desulphurised product are set out in the following table.

| Catalyst age | | 218 stream hours |
|---|---|---|
| Test | Feedstock | Product after Desulphurisation |
| S. G. | 0.794 | 0.7935. |
| Distillation: | | |
| I. B. P., ° C | 157.5 | 145. |
| F. B. P., ° C | 243 | 250. |
| Burning Test: | | |
| Char Value | 28.4, 29.7 | 11, 12. |
| Glass | Blue grey film | Faint grey bloom. |
| Sulfur, weight per cent | 0.127 | 0.0001. |
| Sulfur removal, per cent | | 99.0. |
| Bromine Number | 1 | 2–3. |
| Aromatics, weight per cent. | 18.4 | 21. |

In addition to the fact that the need for an extraneous source of hydrogen is obviated, the process of the invention as applied to kerosene yields a saturated product of low sulphur content, sweet smelling and of low char value, while as applied to white spirits it yields a saturated product of good odor, low sulphur content and improved quality for use, for example, as a solvent. Furthermore, the process of the invention is carried out at a low pressure as compared with known processes thereby avoiding the use, in the manufacture of the plant, of alloy steels capable of withstanding high pressures.

We claim:

1. In a process for the hydrocatalytic desulphurization of a sulphur-and-naphthene-containing petroleum fraction boiling within the range of about 150–240° C., wherein the fraction is passed in vapor form to a reaction zone wherein it is contacted in the presence of hydrogen and at elevated temperature and pressure with a dehydrogenation-hydrogenation catalyst which is immune to sulphur poisoning and combines activity for the dehydrogenation of naphthenes to aromatics with activity for the hydrogenation of organically combined sulphur in the fraction to hydrogen sulphide, and wherein the treated fraction is removed from the reaction zone and the hydrogen sulphide subsequently removed therefrom, the method of operating the process so that it will be self-supporting with respect to the amount of hydrogen needed and produce product oil having, except for lowered sulphur content, properties and boiling range substantially the same as the feedstock, comprising the steps of passing the fraction to be treated through said reaction zone and contacting the fraction therein with said catalyst and with hydrogen derived solely from the oil, maintaining a selected temperature in said zone between about 700° F. to about 800° F. at which hydrogen is produced continuously from said fraction, maintaining a selected pressure in said zone between about 50 to about 250 lb./sq. in. gauge, said selected temperature and pressure being correlated to effect the dehydrogenation of naphthenes contained in the fraction to an extent not substantially in excess of that required to produce sufficient hydrogen to convert the organically combined sulphur into hydrogen sulphide and to maintain the pressure in the reaction zone, separating the products from the reaction zone into the desired liquid product oil substantially free of sulphur, a hydrogen sulphide-rich gas mixture, and a hydrogen-rich gas mixture, and recycling said hydrogen-rich gas mixture to the reaction zone as the sole source of hydrogen to said zone and at a rate sufficient to maintain the necessary partial pressure of hydrogen therein.

2. A process in accordance with claim 1 wherein said catalyst is of the cobalt-molybdate-on-alumina type.

3. A process in accordance with claim 1 in which said selected temperature is approximately 780° F. and said selected pressure is approximately 100 lb./sq. in.

4. A process in accordance with claim 3 wherein said catalyst is of the cobalt-molybdate-on-alumina type.

5. A process in accordance with claim 1 including cooling the products from the reaction zone under substantially the reaction pressure, separating the uncondensed hydrogen-rich gas mixture from the liquid condensate of said cooling operation, said condensate containing dissolved hydrogen sulphide, depressuring said liquid condensate to separate a hydrogen sulphide-rich gas from the desired substantially sulphur free liquid product oil, and recycling said hydrogen-rich gas mixture to the reaction zone as the sole source of hydrogen to said zone.

6. A process in accordance with claim 1 in which the space velocity of said fraction is not in excess of about 10 v./v./hr. and in which the hydrogen-rich gas mixture is recycled to said reaction zone at a rate between about 4000 and 6000 cu. ft. per barrel of feedstock.

FREDERICK WILLIAM BERTRAM PORTER.
FRANK ROBERT GEORGE GREEN.

REFERENCES CITED

The following references are of record in the file of this patent:

UNITED STATES PATENTS

| Number | Name | Date |
|---|---|---|
| 1,957,787 | Krauch et al. | May 8, 1934 |
| 2,000,960 | Joseph | May 14, 1935 |
| 2,037,790 | Ipatieff | Apr. 21, 1936 |
| 2,315,144 | Watson | Mar. 30, 1943 |
| 2,325,034 | Byrns | July 27, 1943 |
| 2,431,920 | Cole | Dec. 2, 1947 |

FOREIGN PATENTS

| Number | Country | Date |
|---|---|---|
| 17,448 | Australia | Aug. 2, 1929 |